United States Patent [19]

Adler

[11] 4,239,300
[45] Dec. 16, 1980

[54] HYDROSTATIC BEARING

[75] Inventor: Josef Adler, Nieder-Ramstadt, Fed. Rep. of Germany

[73] Assignee: Polysius AG, Fed. Rep. of Germany

[21] Appl. No.: 5,159

[22] Filed: Jan. 22, 1979

[30] Foreign Application Priority Data

Feb. 10, 1978 [DE] Fed. Rep. of Germany ....... 2805711

[51] Int. Cl.³ .................. F16C 17/06; F16C 32/06; F16C 39/04
[52] U.S. Cl. ........................................ 308/9; 308/160
[58] Field of Search ............... 308/5 R, 9, 160, 170, 308/DIG. 1

[56] References Cited

U.S. PATENT DOCUMENTS

| 4,073,549 | 2/1978 | Christ et al. | 308/9 |
| 4,099,802 | 7/1978 | Heinemann et al. | 308/9 |
| 4,113,325 | 9/1978 | Miller | 308/9 |
| 4,114,959 | 9/1978 | Christ | 308/9 |

FOREIGN PATENT DOCUMENTS

| 1335362 | 7/1963 | France | 308/5 R |
| 2334001 | 7/1977 | France | 308/9 |

*Primary Examiner*—Richard R. Stearns
*Attorney, Agent, or Firm*—Jones, Thomas & Askew

[57] ABSTRACT

This invention relates to a hydrostatic bearing for rotating parts, more particularly a radial bearing for heavy machine parts, such as drums, comprising a fixed bearing pedestal and a bearing shoe which is mounted for limited wobbling movement about the bearing axis relative to the bearing pedestal and for hydraulic adjustment relative to the rotating machine part and which comprises a bearing surface fed with hydraulic carrier medium, the bearing shoe being connected to the bearing pedestal through a hydraulically operable supporting membrane.

20 Claims, 8 Drawing Figures

HYDROSTATIC BEARING

Hydrostatic bearing systems are being used to an increasing extent in practice for heavy rotating machine parts, for example races of large drums, hollow journals, hollow shafts and the like. In general, a hydrostatic bearing system of the type in question comprises several hydrostatic bearings of the type mentioned above which slidingly support the machine part with their bearing surfaces and, at the same time, are adjustable.

In operation, each bearing surface of a bearing shoe, in the form of a flat recess, is fed with hydraulic carrier medium (for example oil) under pressure. As a result, the rotating machine part is slightly lifted off the bearing surface of the bearing shoe to form a gap through which the carrier medium is able to flow in throttled form. The size of this gap is a function of the load and, hence, a function of the pressure, fluid flow and viscosity of the carrier medium. Accordingly, the rate of flow of the carrier medium has to be gauged in such a way that the gap formed has a certain width.

Due to the fact that large rotating machine parts run unevenly for structural and operational reasons, the bearing shoe of a bearing of the type in question is arranged to wobble relative to the bearing pedestal. It is known in the prior art to provide a ball support between the bearing shoe and the bearing pedestal to accommodate for the wobbling movement of a bearing shoe and for the adjustability of its bearing surface relative to the rotating machine part. The frictional forces between the ball and the bearing shoe which inhibit the wobbling movement are reduced by the provision of a hydraulic piston-and-cylinder assembly. The particular disadvantage of a construction such as this lies in the considerable structural outlay required to obtain the wobbling movement of the bearing shoe. Above all, the spherical surfaces provided have to be produced with a fairly high degree of precision. In addition, heavily stressed seals and other components subjected to friction are also exposed to serious wear, with the result that leakages and, hence, operational disturbances can frequently occur, giving rise to increased maintenance work.

In the embodiment of a hydrostatic bearing according to U.S. Pat. No. 4,099,802 the disadvantages referred to above are obviated by connecting the bearing shoe to the bearing pedestal through a hydraulically operable supporting membrane. In this way, the bearing shoe is as it were hydraulically supported by the membrane on the associated bearing pedestal. This configuration and arrangement of the supporting membrane provides for a limited, but nevertheless entirely adequate wobbling movement and adjustable support of the bearing shoe. Another major advantage of this embodiment according to the U.S. Pat. No. 4,099,802 lies in the outstanding guiding properties of the supporting membrane which, in addition, develops adequate restoring forces in contrast to a ball support. Another particularly important advantage lies in the relatively simple and inexpensive production of the component parts and in the elimination of joints and special seals, so that hardly any mechanical wear occurs, considerably reducing the need for maintenance work.

The object of the present invention is further to improve a hydrostatic bearing of the type mentioned at the beginning (i.e. according to the U.S. Pat. No. 4,099,802) in such a way that, for the same load, an even more compact overall structure is possible and in such a way that, in addition, the supporting membrane in particular is exposed to less intense compulsive deformation forces.

According to the invention, this object is achieved in that the supporting membrane has a jacket zone which is deformable substantially parallel to the bearing axis.

If, in accordance with the U.S. Pat. No. 4,099,802, the supporting membrane is designed and arranged in such a way that, in its rest position, it lies substantially in a plane which extends substantially parallel to the plane containing the bearing surface and, in doing so, partly closes one side of a pressure-tight hydraulic chamber which communicates with a source of hydraulic carrier medium and which contains a cushion of this carrier medium acting hydraulically on the supporting membrane, the bearing shoe can be adjusted with considerable precision relative to the rotating machine part by the hydraulic cushion. However, a sufficiently large free span in the above mentioned plane of the supporting membrane is required for the transverse movement necessary for obtaining the wobbling movement of the supporting membrane, so that a correspondingly large quantity of the carrier medium and a correspondingly high hydraulic pressure are required for the adjustability of the bearing shoe. In addition, where the supporting membrane is designed and arranged in the manner described above, it is exposed to relatively severe compulsive deformation forces.

By contrast, the hydraulically operable supporting membrane according to the present invention is provided with a deformable jacket zone which extends parallel to the bearing axis and, as a result, is for the most part only deformed in the longitudinal direction of this jacket zone in the event of a wobbling movement in conjunction with the adjustable support of the bearing shoe. By comparison with the above-described embodiment according to U.S. Pat. No. 4,099,802 there is thus no need for a large free span for the supporting membrane with the result that, for the same loads and lifting forces, the compulsive deformation forces occurring are less intense than those to which the membrane is subjected in the embodiment according to U.S. Pat. No. 4,099,802, which in turn means that, in this embodiment according to the present invention, less hydraulic medium or a lower hydraulic pressure is necessary for the same structural dimensions or that more compact constructions are possible for the same loads.

In this embodiment according to the invention, it is also possible with advantage to use highly elastic deformable materials which present very few problems in terms of durability.

In other respects, the hydraulic activation of the supporting membrane and the configuration and delivery of hydraulic medium both to the bearing surface of the bearing shoe and also to the supporting membrane (inside a hydraulic chamber) are exactly the same as described in U.S. Pat. No. 4,099,802. The same also applies to the association and hydraulic control of a hydrostatic bearing of the type in question within a hydrostatic bearing system.

Further details of the invention will become apparent from the subsidiary claims and from the following description of some embodiments illustrated by way of example in the accompanying drawings, wherein:

FIG. 1 shows a first embodiment of a hydrostatic bearing 1 according to the invention which is particularly intended to serve as a radial bearing for heavy machine parts of the type mentioned earlier on and of which the general structure (except for the construction of the supporting membrane) also applies to FIGS. 2 to 8 which will be described hereinafter.

Figure 1:
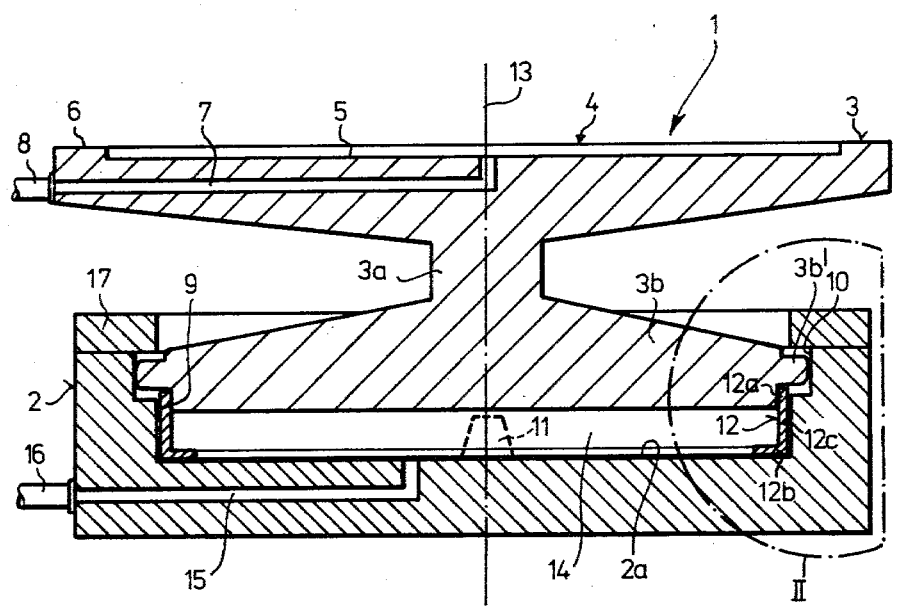
FIG. 1 is a vertical section taken in the region of the bearing axis through a hydrostatic bearing according to the invention with a first embodiment of the supporting membrane.

The bearing 1 contains a fixedly arranged bearing pedestal 2 and a bearing shoe 3 which is mounted for limited wobbling movement relative to the bearing pedestal 2 and which comprises a bearing surface 4 fed with hydraulic carrier medium, preferably oil under pressure. This bearing surface 4 is formed with a flat oil pocket 5 which is open towards the rotating machine part (not shown) and which is surrounded on all sides by a flange-like rim 6 on which the rotating machine part can rest in its inoperative position, but from which the rotating machine part is lifted in operation in known manner by the carrier oil delivered under pressure, so that a gap of certain width is formed in between. The hydraulic carrier medium is directly delivered to the oil pocket 5 through a separate feed passage 7 provided in the bearing shoe 3 from a feed pipe 8 which is connected to a source (not shown) of hydraulic carrier medium.

As can be seem from FIG. 1, the bearing shoe 3, regarded over its height, is pin-like, i.e. of reduced cross-section, at its centre 3a which is adjoined by the lower part 3b of the bearing shoe which widens out again in the form of a plate.

The bearing pedestal 2 is substantially box-like with a relatively deep, upwardly open recess 9 which forms a hydraulic chamber part of the bearing pedestal 2. The plate-like lower part 3b of the bearing show projects into this upwardly open recess 9 of the bearing pedestal 2, the peripheral rim of this lower part 3b projecting by means of a peripheral projection 3b' into a corresponding peripheral guide groove 10 in the upper, inner edge of the bearing pedestal 2. The peripheral projection 3b' of the lower part 3b of the bearing shoe preferably approximates a compound curve in cross section which is of advantage in particular to the wobbling movement of the bearing shoe 3 relative to the bearing pedestal 2 and, above all, to the movement of the peripheral projection 3b' within the peripheral guide groove 10. The peripheral projection 3b' and the peripheral guide groove 10 limit the wobbling movement of the bearing pedestal 2 relative to the bearing shoe 3. In order, in addition, to be able to counteract an excessive downward movement of the bearing shoe 3 in the event of overloading of the bearing, the inner base of the bearing pedestal 2 is preferably provided, as indicated in chain lines, with a central projection 11 which, in the rest position of the bearing shoe 3, is separated by a sufficiently large interval from its lower part 3b. It would of course also be possible for the same purpose to provide a corresponding central projection on the underneath (opposite the inner base of the bearing pedestal 2) of the lower part 3b of the bearing shoe or, alternatively, even to provide two correspondingly short central projections on the one hand on the lower part 3b of the bearing shoe, and on the other hand, on the inner base of the bearing pedestal 2.

As also shown clearly in FIG. 1, the lower part 3b of the bearing shoe is connected in the region of its peripheral rim (below the peripheral projection 3b') to the upper end 12a of a supporting membrane 12 (by means of screws or rivets), of which the lower end 12b rests on and is firmly secured to the inner base 2a of the bearing pedestal 2 by virtue of the fact that this lower end 12b of the membrane is bent inwards at a right angle. Fixing to the base 2a of the bearing pedestal may be obtained by means of screws, rivets or even adhesives. FIG. 1 shows that this supporting membrane 12 has a deformable jacket zone 12c substantially parallel to the bearing axis 13 (which extends substantially perpendicularly in the inoperative state of the bearing 1).

A hydrualic chamber 14 is formed between the inner base 2a of the bearing pedestal 2, the underneath of the lower part 3b of the bearing shoe and the inside of the supporting membrane 12, communicating with a source (not shown in detail) of hydraulic carrier medium through a passage 15 provided inside the bearing pedestal 2 and a line 16 connected thereto. In this way, given a corresponding supply of pressure medium (preferably oil), a cushion acting hydraulically on the supporting membrane 12 is formed from the carrier medium in the pressure-tight hydraulic chamber 14. Under the effect of the hydraulic carrier medium, the jacket zone 12c of the supporting membrane 12 is pressed against the inner peripheral wall of the recess 9 forming the hydraulic chamber part of the bearing pedestal 2.

In this first embodiment of the invention illustrated in FIG. 1, the supporting membrane 12 essentially consists solely of the deformable jacket zone 12c which, at its axial ends 12a and 12b, is fixed, preferably by screwing or riveting, to the bearing pedestal 2 on the one hand and to the bearing shoe 3 on the other hand. This supporting membrane 12 essentially consists solely of a tough, elastically deformable rubber-like material which has a low modulus of elasticity. The expression "rubber-like" material is intended to include in particular natural rubber, synthetic rubber, corresponding plastics materials or similar materials. Above all, this material should also be particularly resistant to the hydraulic carrier medium.

Finally, it is pointed out in connection with FIG. 1 and with the general structure of the bearing 1 that the upper edge of the peripheral wall of the bearing pedestal 2 is formed by a preferably screwed-on ring 17 which, at the same time, forms the upper boundary of the peripheral guide groove 10. This configuration of the upper end of the bearing pedestal 2 facilitates insertion of the lower part 3b of the bearing shoe into the recess 9 of the bearing pedestal 2 and, in particular, the insertion of the peripheral projection 3b' of the lower part 3b of the bearing shoe into the peripheral guide groove 10 of the bearing pedestal 2.

Figure 2:
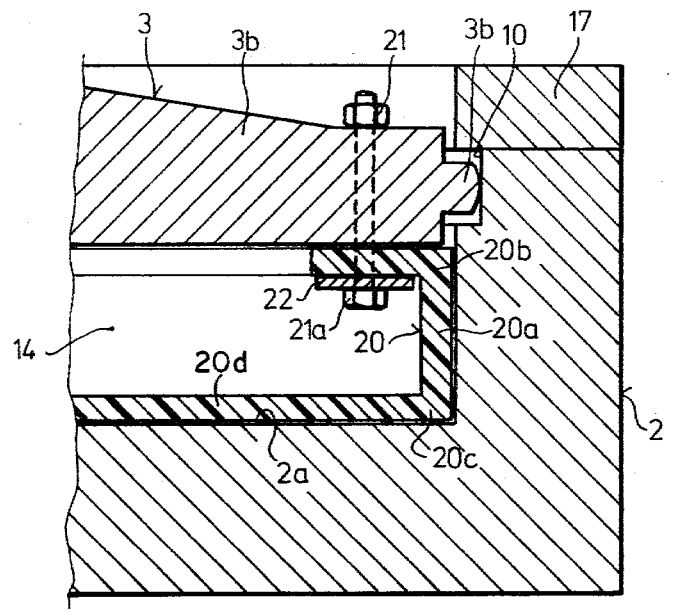
FIG. 2 shows a detail (II) of FIG. 1 on a larger scale, but with a second embodiment of the supporting membrane.

A second embodiment of the supporting membrane is described in the following with reference to FIG. 2 in which those elements which are structurally identical with the elements in FIG. 1 are denoted by the same reference numerals so that there is no need for them to be described in detail again.

The difference between this embodiment and the embodiment illustrated in FIG. 1 lies solely in the design of the supporting membrane 20. This supporting membrane 20 also has a jacket zone 20a deformable substantially parallel to the bearing axis. At the upper axial end 20b of the jacket zone 20a, the supporting membrane 20 is bent down at substantially a right-angle and fixed to the underneath of the lower part 3b of the bearing shoe. A screw 21 is preferably provided for fixing this upper axial end 20b, a layer 22, preferably of metal, being provided between the screw head 21a accommodated in the hydraulic chamber 14 and the bent portion of the membrane.

The lower axial end 20c of the jacket zone 20a of the membrane is integrally connected to a plate-like membrane portion 20d which extends at substantially a right angle thereto and which is in contact with the inner base 2a of the bearing pedestal 2. This plate-like membrane portion 20d may also be fixed, for example by bonding, to the inner base 2a of the bearing pedestal 2.

The supporting membrane 20 may also be made of the same material which was mentioned in the description of the first embodiment. This embodiment of the invention also works in the same way as the embodiment illustrated in FIG. 1.

Whereas, in the embodiment illustrated in FIG. 2, the supporting membrane is arranged with its plate-like portion on the inner base of the bearing pedestal, it is of course also possible to arrange the supporting membrane in the opposite way, i.e. to fix the plate-like portion of the membrane to the underneath of the lower part of the bearing shoe and subsequently to secure the other axial end of the jacket zone, which is only bent downwards over a short distance, to the inner base of the bearing pedestal in a suitable manner. There is nothing different in the basic mode of operation of this supporting membrane.

Figure 3:
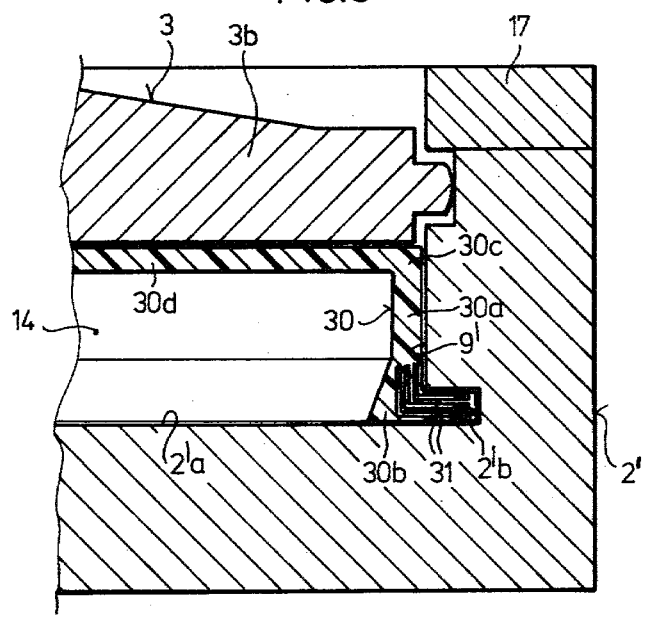
FIGS. 3 to 8 are similar detail views to FIG. 2, but of another six examples of supporting membranes designed in accordance with the invention.

In the third embodiment of the invention illustrated in FIG. 3, the bearing pedestal 2' and the bearing shoe 3 are again constructed in largely the same way as in FIGS. 1 and 2 so that, once again, identical elements are denoted by the same reference numerals. Only the bearing pedestal 2' is slightly different in so far as it has a peripheral groove 2'b starting from the inner base 2'a on the inside of the recess 9'.

The supporting membrane 30 provided in this case is similar in design to the supporting membranes of the other embodiments. It has a deformable jacket zone 30a extending substantially parallel to the bearing axis, a lower axial end 30b which is angularly bent outwards and an upper axial end 30c of the jacket zone 30a which is again integrally connected to a plate-like membrane portion 30d which extends at substantially a right angle thereto and which, in this case, is fixed to the underneath of the lower part 3b of the bearing shoe in the manner described earlier on.

The lower axial end 30b of the jacket zone 30a which is bent angularly outwards engages in the inner peripheral groove 2'b provided in this case in the bearing pedestal 2' in which it is firmly secured or held.

The supporting membrane 30 of this embodiment may again largely be made of the same material as in the preceding embodiments. As shown in FIG. 3, however, it is preferred additionally to provide stiffening inlays 31, preferably of spring steel, in the region of the lower axial end 30b which is bent outwards.

Whereas, in addition, the supporting membranes in all the preceding embodiments have substantially the same thickness, the supporting membrane 30 provided in this example, although for the most part also having substantially the same thickness, is provided near the lower axial end 30b of the jacket zone 30a with a substantially wedge-shaped thickening directed inwards into the hydraulic chamber 14. In this way, the outwardly bent part of the lower end 30b of the membrane can be safely held in the inner peripheral groove 2'b of the bearing pedestal 2' under the pressure of the carrier medium situated in the hydraulic chamber 14.

Figure 4:
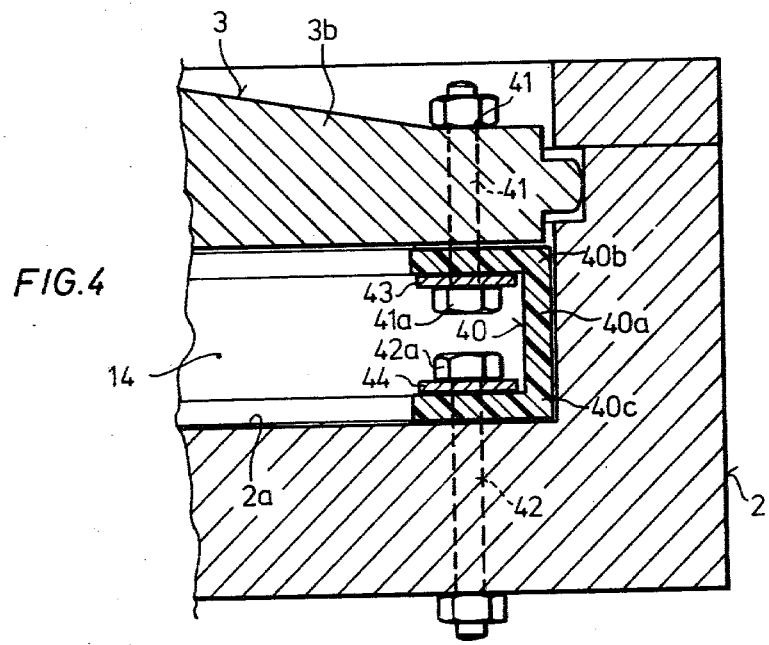

In the embodiment illustrated in FIG. 4, the bearing pedestal 2 and the bearing shoe 3 are again constructed in the same way as described in reference to FIG. 1, so that once again identical elements are denoted by the same reference numerals.

The supporting membrane 40 of this fourth embodiment has a substantially U-shaped cross section and again consists essentially of the jacket zone 40a, of which the upper end 40b and the lower end 40c are bent inwards at substantially a right angle, being fixed to the base of the bearing pedestal 2 on the one hand and to the lower part 3b of the bearing shoe on the other hand at these bent ends by means of screws 41 and 42. As in one of the preceding examples, stiffening layers preferably consisting of metal are again provided between the internally situated screw heads 41a and 42a and the supporting membrane 40.

Figure 5:
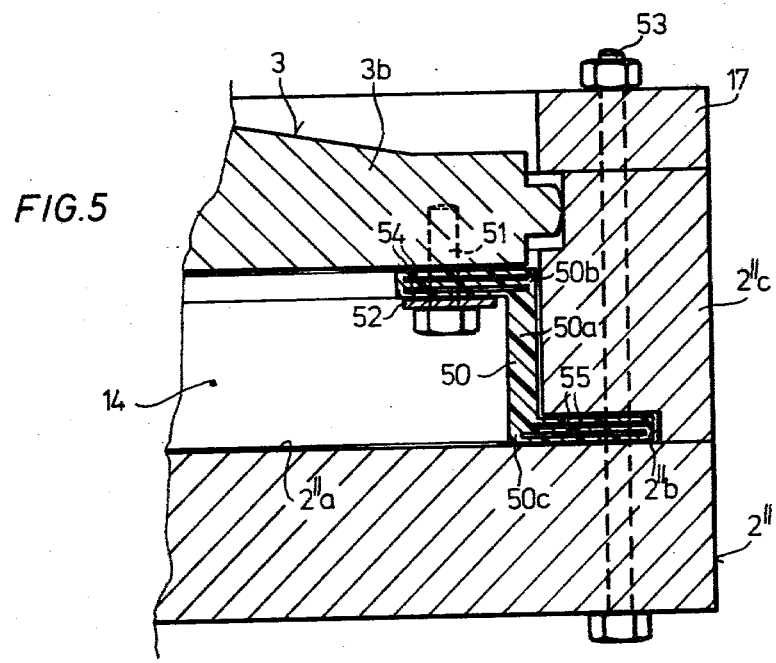

In the embodiment illustrated in FIG. 5, the supporting membrane 50 again consists essentially of the jacket zone 50a which extends substantially parallel to the bearing axis and is deformable in this direction and of which the upper axial end 50b is bent inwards towards the hydraulic chamber 14 and, with this bent portion, is fixed to the underneath of the lower part 3b of the bearing shoe by means of a screw 51 with a metal layer 52 in between. In this case, the lower axial end 50c of the jacket zone, 50a of the membrane is bent outwards and, in the same way as in the embodiment illustrated in FIG. 3, is fixed in an inner peripheral groove 2'b of the bearing pedestal 2' which starts from the inner base 2"a of the bearing pedestal 2" and preferably extends so far outwards that the bent portion of the membrane secured therein is simultaneously penetrated by a screw 53 which projects axially through the peripheral wall of the bearing pedestal 2" and which, at the same time, holds the upper closure ring 17. In this case, the peripheral wall of the bearing pedestal 2" may be formed by a separate annular central wall 2"c which is also held by the screw 53 relative to the bearing pedestal 2".

As also shown in FIG. 5, stiffening inlays 54 and 55, preferably in the form of spring steel plates, are provided in the bent membrane portions at the axial ends 50b and 50c.

The lower axial end 50c of this supporting membrane 50 could of course also be designed and fixed in the same way as the lower axial end 30b of the embodiment illustrated in FIG. 3. In any event, the rest of the supporting membrane 50 may again be made of the rubber-like material mentioned earlier on.

Figure 6:
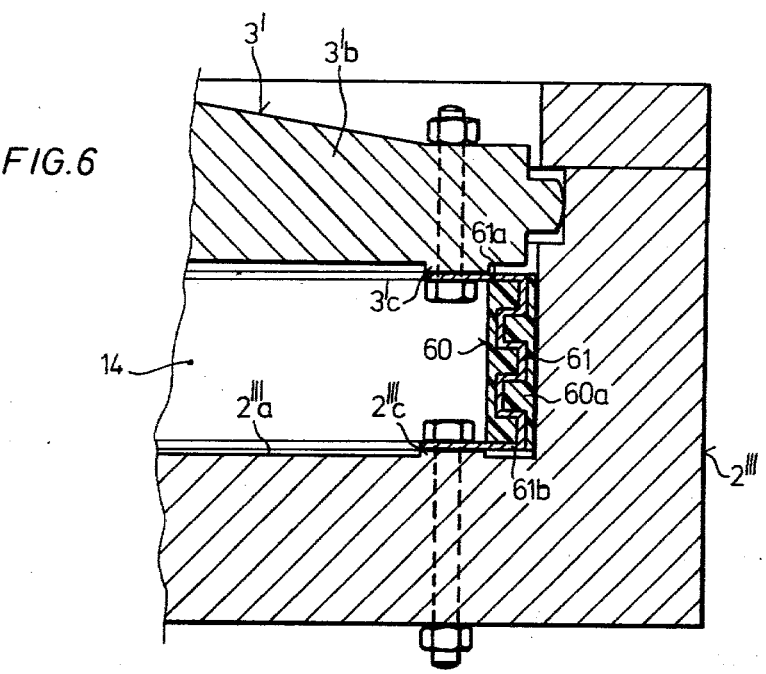
Figure 7:
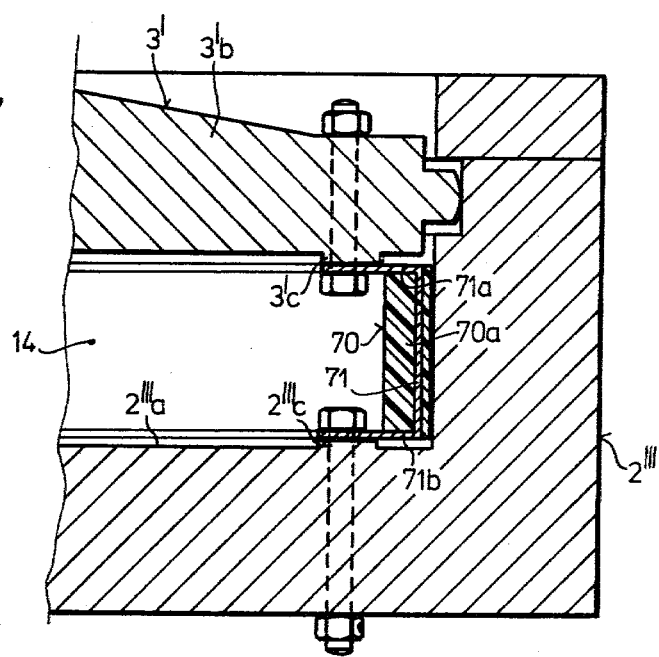

FIGS. 6 and 7 show another two fundamentally similar embodiments of, in particular, the supporting membranes.

The embodiments of the supporting membranes 60 and 70 shown in these two Figures again consist essentially of the jacket zone 60a and 70a deformable substantially parallel to the bearing axis. Both in the supporting membrane 60 shown in FIG. 6 and also in the supporting membrane 70 shown in FIG. 7, a spring steel inlay 61 and 71 extending over the entire axial length of the jacket zone 60a and 70a is provided in the rubber-like material (same composition as before). The axial ends 61a, 61b and 71a, 71b of these spring steel inlays 61 and 71 are bent downwards at substantially a right angle and are screwed on the one hand to the underneath of the lower part 3'b of the bearing shoe and on the other hand to the inner base 2'''a of the bearing pedestal 2'''. To improve the elasticity or flexibility of the axial ends 61a, 61b and 71a, 71b of these supporting membranes 60 and 70, they may be provided with annular projections 3'c and 2'''c at the points where they are fixed to the lower part 3'b of the bearing shoe on the one hand and to the inner base 2'''a of the bearing pedestal 2''' on the other hand.

Whereas, in addition, the supporting membrane 60 in the example shown in FIG. 6 has a spring steel inlay 61 which, regarded in cross section through the jacket zone 60a, has a substantially angular and undulating axial configuration, the supporting membrane 70 shown in FIG. 7 has a spring steel inlay 71 which extends substantially rectilinearly in the axial direction of the jacket zone 70a.

Figure 8:
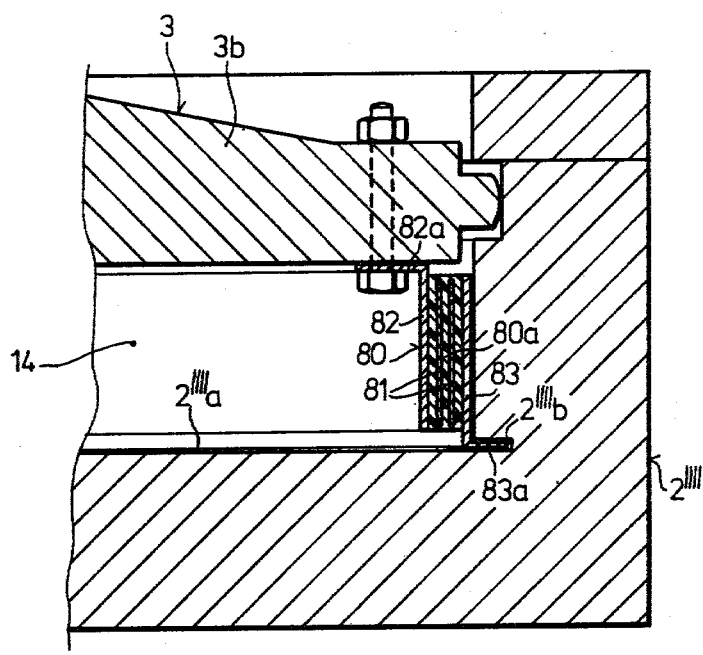

Finally, FIG. 8 shows another embodiment of the supporting membrane 80 which again consists essentially of the jacket zone 80a deformable substantially parallel to the bearing axis. In this case, flat inlays 81, preferably of spring steel plate, which extend substantially parallel to the bearing axis are embedded in the tough, elastically deformable rubber-like material of the jacket zone 80a. In addition, flat spring-steel plates 82 and 83 are fixed to the jacket zone 80a on both outsides, the inner plate 82 being bent inwards at substantially a right angle at the upper axial end of the jacket zone 80a, whilst the outer plate 83 is bent outwards at substantially a right angle at the lower axial end of the jacket zone 80a. The upper angle 82a of the inner plate 82 is screwed to the underneath of the lower part 3b of the bearing shoe, whilst the lower axial angle 83a of the outer plate 83 is again firmly engaged in an inner peripheral groove 2''''b of the bearing pedestal 2'''' which starts from the inner base 2''''a of the bearing pedestal.

The bond between the inner inlays and the outer covering layers of the supporting membranes may be established by vulcanisation. In this way, the bearing shoe 3 and the bearing pedestal 2'''' are connected on the lines of a movable bearing of the type used for example in bridge construction, with the result that the bearing shoe 3 is capable of making fairly significant movements.

In all the embodiments described above, an excellent pressure-tight seal of the hydraulic chamber 14 is obtained in conjunction with a firm support which provides for wobbling movement between the bearing shoe and the bearing pedestal, favourable deformability of the jacket zone of the supporting membrane with reliably acting restoring forces being guaranteed in every case.

Finally, it is pointed out that, according to the invention, the bearing pedestal may have any suitable cross-sectional form (as seen in the horizontal cross section), although a substantially circular cross section is generally preferred so that, in this case, the overall cross section of the supporting membrane correspondingly, resembles a tube or hollow cylinder (as seen in the horizontal cross section).

While this invention has been described in specific detail with particular reference to preferred embodiments thereof, it will be understood that variations and modifications can be effected within the spirit and scope of the invention as described hereinbefore and as defined in the appended claims.

I claim:

1. A hydrostatic bearing for rotating machine parts, more particularly a radial bearing for heavy machine parts, such as drums, comprising a fixed bearing pedestal defining an upwardly facing recess, a bearing shoe mounted in said recess for limited wobbling movement about a bearing axis extending upwardly through the recess of said bearing pedestal and for hydraulic adjustment relative to the rotating machine part, said bearing shoe including an upper surface defining a recess, and means for supplying the recess of said bearing shoe and the recess of said bearing pedestal with a hydraulic carrier medium, a hydraulically operable supporting membrane movably connecting said bearing shoe to said bearing pedestal about the recess of said bearing pedestal characterised in that the supporting membrane comprises an annular jacket zone which is deformable substantially parallel to the bearing axis.

2. A hydrostatic bearing as claimed in claim 1, characterised in that the supporting membrane is fixed to at least the bearing pedestal or to the bearing shoe at the axial ends of its deformable jacket zone.

3. A hydrostatic bearing as claimed in claims 1 or 2, characterised in that the supporting membrane (20; 30) is bent angularly inwardly at one axial end (20b; 30b) and in this way is fixed to the bearing shoe (3) or to the bearing pedestal (2'), whilst the other axial end (20c; 30c) is integrally connected to a plate-like portion (20d; 30d) of the membrane which extends substantially at a right-angle thereto and which rests on the inner base (2a) of the bearing pedestal (2) or on the underneath of the bearing shoe (3).

4. A hydrostatic bearing as claimed in claim 3, characterized in that the plate-like portion (20d; 30d) of the membrane is fixed to the inner base (2a) of the bearing pedestal (2) to the underneath of the bearing shoe (3).

5. A hydrostatic bearing as claimed in claim 2, characterised in that the two axial ends (for example 12a, 12b) of the deformable jacket zone (for example 12c) of the supporting membrane (for example 12) are fastened to the bearing pedestal (2) on the one hand and to the bearing shoe (3) on the other hand.

6. A hydrostatic bearing as claimed in claim 5 characterised by the two axial ends of the deformable jacket zone being turned inwardly and in abutment with the recess of said bearing pedestal and in abutment with bearing shoe, and further including metal covering layers on at least one of the inwardly turned ends of the deformable jacket zone.

7. A hydrostatic bearing as claimed in claims 1, 2 or 5, characterised in that the supporting membrane (;60;70;80) essentially consists solely of the deformable jacket zone (;60a;70a;80a) which in turn essentially consists of a tough, elastically deformable rubber-like material and metal inlays embedded therein.

8. A hydrostatic bearing as claimed in claim 7, characterised in that a spring steel inlay (61; 71) extending over the entire axial length of the jacket zone (60a; 70a) is embedded in rubber-like material, its axial ends (61a; 61b; 71a; 71b) being bent substantially at a right-angle and being fixed to the bearing pedestal (2''') and to the bearing shoe (3').

9. A hydrostatic bearing as claimed in claim 8, characterised in that the spring steel inlay (71) extends substantially rectilinearly in the axial direction of the jacket zone (70a).

10. A hydrostatic bearing as claimed in claim 8 charasterised in that the spring steel inlay (61) follows a substantially undulating axial path, as seen in cross-section through the jacket zone (60a).

11. A hydrostatic bearing as claimed in claim 7, characterised in that the jacket zone (80a) of the supporting membrane (80) is provided on its outsides with angular metal coverings (82, 83) one of which is fixed to the bearing shoe (3) and the other to the bearing pedestal (2'''').

12. A hydrostatic bearing as claimed in claim 1, characterised in that at least the deformable jacket zone (for example 12c) of the supporting membrane (for example 12) consists essentially of a tough, elastically deformable material having a low modulus of elasticity.

13. A hydrostatic bearing as claimed in claim 12, characterised in that the supporting membrane is formed of a material selected from the group consisting of natural rubber, synthetic rubber or plastics, each of which are resistant to the hydraulic carrier medium.

14. A hydrostatic bearing as claimed in claim 1, characterised in that a hydraulic chamber (14) is formed between the inner base of the bearing pedestal, the underneath of the bearing shoe and the inside of the supporting membrane, communicating through a pipe with a source for hydraulic carrier medium and containing the hydraulic carrier medium which acts on the supporting membrane.

15. A hydrostatic bearing as claimed in claim 14, characterised in that a central projection (11) is provided at least on one of the underneath of the bearing shoe and the inner base (2a) of the bearing pedestal (2) for axially limiting the movement of the bearing shoe (3).

16. A hydrostatic bearing as claimed in claim 1, characterised, in that the lower part of the bearing shoe is plate-shaped and projects into the upwardly open hydraulic chamber part (9) of the bearing pedestal, the peripheral edge of the lower part (3b) of the bearing shoe projecting by means of a peripheral projection (3b') into a corresponding peripheral guide groove at the inner upper end of the bearing pedestal.

17. A hydrostatic bearing as claimed in claim 16, characterised in that the peripheral projection (3b') is substantially in the form of a compound curve in cross-section.

18. A hydrostatic bearing as claimed in claim 1, characterised in that the recess of the bearing plate is formed by an annular sidewall, and the annular jacket zone of the supporting membrane is pressed against the annular side wall of the recess of the bearing pedestal under the effect of the hydraulic carrier medium.

19. A hydrostatic bearing for rotating parts, comprising:
a fixed bearing pedestal including an upwardly open recess defined therein;
a bearing shoe positioned within said open recess of said bearing pedestal and defining a hydraulic chamber in the recess of said bearing pedestal and protruding above the bearing pedestal;
a fluid passage in communication with said hydraulic chamber for supplying fluid under pressure to said hydraulic chamber to movably support said bearing shoe within said bearing pedestal, whereby the bearing shoe is free to wobble with respect to the bearing pedestal about a vertical bearing axis extending through the central portion of said hydraulic chamber;
means for limiting the wobbling movement of said bearing shoe relative to said bearing pedestal about a vertical bearing axis; and
a hydraulically operable supporting membrane connecting said bearing shoe to said bearing pedestal, said support membrane comprising a jacket zone extending approximately parallel to the bearing axis and deformable substantially parallel to the bearing axis.

20. Hydrostatic bearing of claim 19, wherein said supporting membrane encircles said hydraulic chamber and forms a pressure-tight seal with said bearing shoe and with said bearing pedestal.

* * * * *